March 6, 1973  T. L. HEWITT  3,718,986
SCANNED AUDIO-VISUAL-RESPONSE TEACHING SYSTEM
Filed April 1, 1971  7 Sheets-Sheet 1

Inventor
Terry L. Hewitt
by Louis A. Moucha

Inventor
Terry L. Hewitt
by Louis A. Moucha

United States Patent Office 3,718,986
Patented Mar. 6, 1973

3,718,986
SCANNED AUDIO-VISUAL-RESPONSE
TEACHING SYSTEM
Terry L. Hewitt, Schenectady, N.Y., assignor to
General Electric Company
Filed Apr. 1, 1971, Ser. No. 130,386
Int. Cl. G09b 7/06
U.S. Cl. 35—9 A
19 Claims

ABSTRACT OF THE DISCLOSURE

A programming component generates self-clocking digital control signals and records them on one track of a magnetic tape and records analog signals on another track for providing audio information to the student. The tape is then utilized in a response component which responds to the digital control signals to provide automatic operations such as remotely operating a visual display device (i.e. a slide projector), for presenting to the student material in lecture form and/or multiple-choice problems. The response component includes electronic logic circuitry for determining the correctness of the student's response to the problems. A pushbutton assembly on the response component permits the student to advance the tape in accordance with the tape recorded program and to indicate his answers to the problems. The response component is interconnected with a data collection and analysis component for recording the student's responses for subsequent computer processing.

My invention relates to a teaching system which features audio, visual and multiple-choice response capabilities, and in particular, to a system in which the response component thereof is interconnected with a data collection and analysis component for recording the student's responses for subsequent computer processing.

The present application is related to applications Ser. No. 130,391 entitled "Group Instruction Audio-Visual Teaching System" and to Ser. No. 130,397 entitled "Free-Standing Audio-Visual-Response Teaching System," concurrently filed with the present application, having the same inventor, and assigned to the assignee of the present invention.

Various techniques are currently being proposed for aiding instructors in their teaching assignments for purposes of increasing their productivity and thereby making it possible for each instructor to teach more students. One of the prior art approaches is the computer-assisted instruction in which a computer is programmed to print out questions and the student literally talks with the computer in providing his answer and is informed of its correctness. The disadvantage of the computer-assisted instruction is the fact that it is very expensive, is most often not provided with audio or visual capabilities, and requires a teletype unit for each student. Other more recent teaching systems include the combination of a phonograph record and slides which has the disadvantage in that the phonograph record is provided with a fixed program and therefore the system is not readily programmable.

Therefore, a principal object of my invention is a teaching system having an audio, visual and student response capability including the recording of the student's responses.

Another object of my invention is to provide the system with a component for readily programming a particular assignment with minimum complexity and low cost.

A further object of my invention is to provide the programming component with a conventional two track magnetic tape recorder wherein self-clocking digital control signals are recorded on one track and analog signals on another track.

A still further object of my invention is to provide the response component of the teaching system with the ability to remotely operate a visual device which presents the teaching assignment to the student.

Another object of my invention is to provide an interconnection between the response component and a data collection and analysis component for recording the student's responses for subsequent computer processing.

Briefly stated, my invention is a teaching system which includes a programming component and a response component interconnected with a data collection and analysis component. The programming component includes electronic logic circuitry for generating self-clocking digital control signals which are recorded on one track of a magnetic tape, and further includes an audio input for recording analog signals on another track for providing audio information to the student. The tape from the programming component is then utilized in the response component which responds to the digital control signals to provide automatic remote operation of a visual display device that presents instructional material to the student. The response component includes electronic logic circuitry for determining the correctness of the student's response to problems presented in the instruction material, and the student's responses are transmitted to the data collection and analysis component for recording the responses for subsequent computer processing. A pushbutton assembly on the response component permits the student to advance the tape and indicate his answers to the problems.

The features of my invention which I desire to protect herein are pointed out with particularity in the appended claims. The invention itself, however, both as to its organization and method of operation, together with further objects and advantages thereof may best be understood by reference to the following description taken in connection with the accompanying drawings wherein like parts in each of the several figures are identified by the same reference character, and wherein:

The teaching system in accordance with my invention includes a programming component, a response component and a data collection and analysis component. The programming component permits an instructor to prerecord a lesson on a conventional tape recorder by recording the requisite audio information on the first track of a magnetic tape in the form of analog signals. The instructor then rewinds the tape, plays back the audio, and records self-clocking digital control (command) signals on a track of the tape at appropriate points in the audio program. The digital control signals direct the operation of a visual display device such as a slide projector or other device capable of presenting a visual display to the student. The digital control signals also cause the response component to stop after a question has been presented to the student on the visual device display and/or on the audio track of the magnetic tape. Upon the stop in the response component operation, the student presses one of a series of five buttons on the response component control panel, indicating his choice of an answer to the question presented. A correct answer is indicated by a light on the response component control panel and the student is then permitted to proceed to the next part of the lesson. An incorrect answer prevents the response component from advancing the tape to the next part of the assignment and requires the student to press another of the five buttons until he has found the correct answer. The tape may also be programmed for questions for which no right-wrong indication is given to the student. The response component, and other similar response components are interconnected with the data collection and analysis component for recording the students' responses for subsequent computer processing such as a detailed computer analysis of the answers.

Figure 1A:
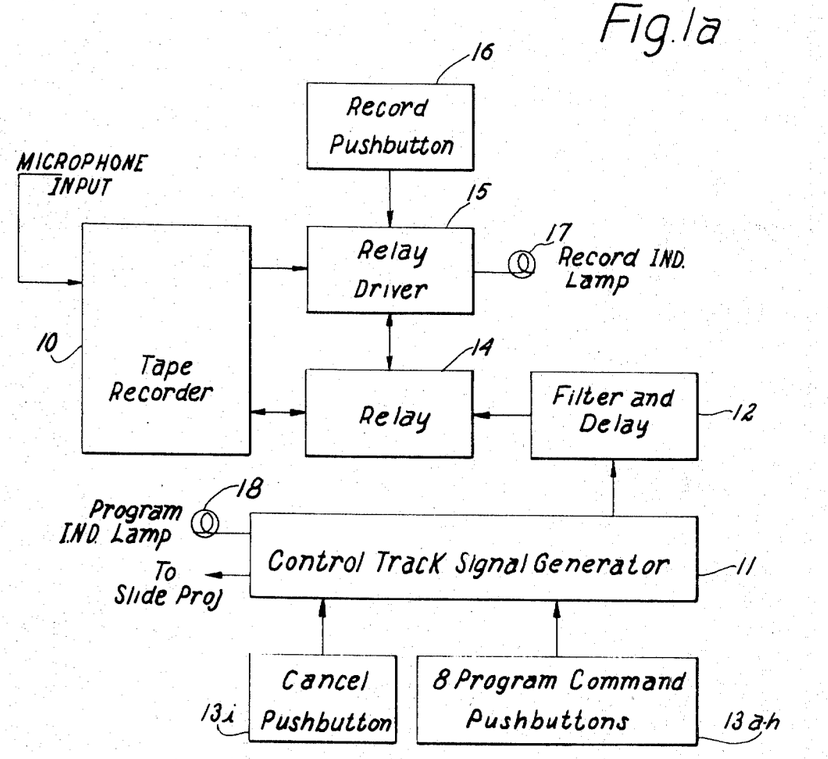
FIG. 1a is a block diagram of the programming component of my teaching system and FIG. 1b illustrates the control panel thereof.
Figure 1B:
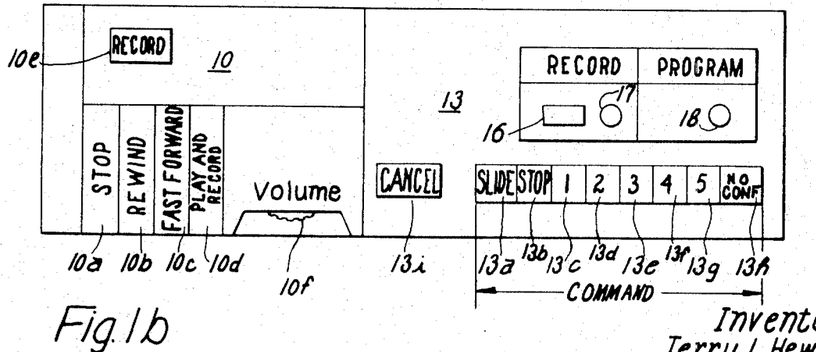

Referring now in particular to FIG. 1a there is shown a block diagram of the programming component and FIG. 1b illustrates a typical control panel provided on the programming component. The programming component as well as the response component are each of small size, portable, and each includes an identical conventional cassette tape recorder 10. The digital control signal is coded to provide eight different commands, namely, STOP, for causing the tape recorder to stop, SLIDE, for causing an advance in the visual display device, five for storing answers to multiple-choice questions presented in the lesson, and a NO CONFIRMATION command for which visual confirmation of the correctness of his answer is not presented to the student. The digital control signal commands are entered simply by pressing and releasing the appropriate one of eight pushbuttons 13a–h on the control panel illustrated on FIG. 1b and labeled SLIDE, STOP, 1, 2, 3, 4, 5 and NO CONF (no confirmation), respectively. Errors in the program may be corrected by the instructor on either the audio or digital track, without affecting the other track, by rewinding past the point of error and then rerecording.

One of the novel aspects of my invention is the particular type of digital control signals employed for providing particular automatic operations of the response component. Prior art cassette tape recorders utilize audio signals alone or audio with a single tone for the remote operation of a slide projector wherein the single tone is superposed on the audio track as an inaudible tone or is recorded on a second track, the tone also adapted for film advance and for stopping operation of the response component.

My use of the aforementioned coding of the digital control signal permits a very simple programming procedure which may be utilized by an instructor having no technical experience in programming thereby rendering my teaching system very versatile. The tape recorder 10 utilizes two-channel, two-track record/playback and erase heads, although the response component tape recorder requires only a two-channel, two-track record/playback head and one channel, two-track erase head. The use of two-channel, two-track playback and erase heads in the programming component tape recorder permits the following operations: audio record and erase, audio playback, audio playback and digital record and erase. Sufficient separation is provided on the magnetic tape between the two channels for isolation between the audio and digital playback signals.

The digital control signals are initially of square wave form, the square waves being generated in a control track signal generator 11. Frequency shaping of the square wave is accomplished in a conventional filter and delay network 12 which includes high and low pass filters to provide a frequency response peaking at approximately 1000 hertz. A delay circuit in network 12 delays the start of the recording of the digital control signal for approximately one second after the start of the erase signal to assure that the digital signal will always be recorded on erased tape when reprogramming the digital track.

The digital control signal is of the pulse-width-modulated type referred to as ⅖ PWM. In this format, a logic ZERO is represented by a pulse which is ⅖ of a period long, and a logic ONE is represented by a pulse which is ⅗ of a period. The leading edge of each pulse is at a common repetition rate and therefore includes the clock information while the pulse width determines whether the bit is a logic ONE or ZERO. The pulse width modulated signal is generated in the control track signal generator 11 which is described in a more detailed block diagram in FIG. 2. The digital PWM signal is recorded continuously on the second (control) track of the magnetic tape and appears as a series of logic ZEROES at all times other than during the time a command is being recorded. As each command is entered, the corresponding digital word is recorded twice with a short time lapse separating the two words to make more certain that at least one of the words is detected during playback. Logic in the response component prevents the second word having any effect if the first word is detected. Six bits words are used to encode each of the eight commands utilized in my system. Each of these eight words has logic ONES as the first and sixth bits as a requirement for detection of a valid word in the playback logic of the response component. The remaining four bits are encoded such that any single bit error will be ignored by the detection logic. Thus, the code is as follows:

```
ANSWER 1 ________________________________ 100011
ANSWER 2 ________________________________ 100101
ANSWER 3 ________________________________ 101001
ANSWER 4 ________________________________ 101111
ANSWER 5 ________________________________ 110001
NO CONFIRMATION ____________________ 110111
SLIDE ADVANCE ______________________ 111011
STOP ____________________________________ 111101
```

The cassette tape recorder 10 is provided with five pushbuttons and one knurled volume control 10f as illustrated in FIG. 1b. Pushbuttons 10a, 10b, 10c and 10d are labeled STOP, REWIND, FAST FORWARD, and PLAY AND RECORD, respectively. Pushbutton 10e is labeled RECORD and must be depressed along with the PLAY AND RECORD pushbutton 10d when recording audio in the programming operation.

The programming component includes the cassette tape recorder 10 and programming unit 13. All of the elements in FIG. 1a except for tape recorder 10 are elements of the programming unit 13. The digital signal produced in control track signal generator 11, with each command entered via a corresponding command pushbutton 13a–13h, is passed through filter and delay network 12 and relay 14, and finally to the digital record channel of the record/playback head on the tape recorder. Relay 14 is a 6-pole relay energized (driven) by a transistor circuit 15 during the digital record mode upon the depression of the (digital) RECORD pushbutton 16 on the programming unit. The first contacts of relay 14 switch the digital signal to the digital track of the record/playback head, the second contacts direct a high frequency record bias signal commonly used in audio recording to the appropriate audio or digital track of the record/playback head, the third contacts interrupt an audio signal path in the recorder to prevent interference with the digital recording, the fourth contacts direct the erase signal to the appropriate audio or digital track of the erase head, the fifth contacts switch on an audio oscillator in the tape recorder during digital record which provides the high frequency signal for both the erase and bias functions, and the sixth contacts latch the relay in the digital record mode after the digital RECORD button 16 on the programming unit is momentarily held down and the tape recorder PLAY AND RECORD button 10d is also depressed, resulting in the tape recorder operating and the relay 14 being energized and latching, and the digital signal then being recorded. The relay 14 switching functions are used in order to utilize the circuitry existing in the conventional tape recorder 10 for both audio and digital control signal recording. The digital record mode is indicated by the lighting of RECORD indicator lamp 17, energized by the relay driver circuit 15. A PROGRAM indicator lamp 18 is lit for several seconds after a digital command signal has been recorded to verify such operation. A CANCEL pushbutton 13i permits an erroneously pressed command pushbutton 13a-13h signal recorded. Upon the stopping of the tape recorder by depressing STOP pushbutton 10a, the relay 14 is unlatched and the contacts thereof return to the nonenergized state of the relay.

Figure 2:
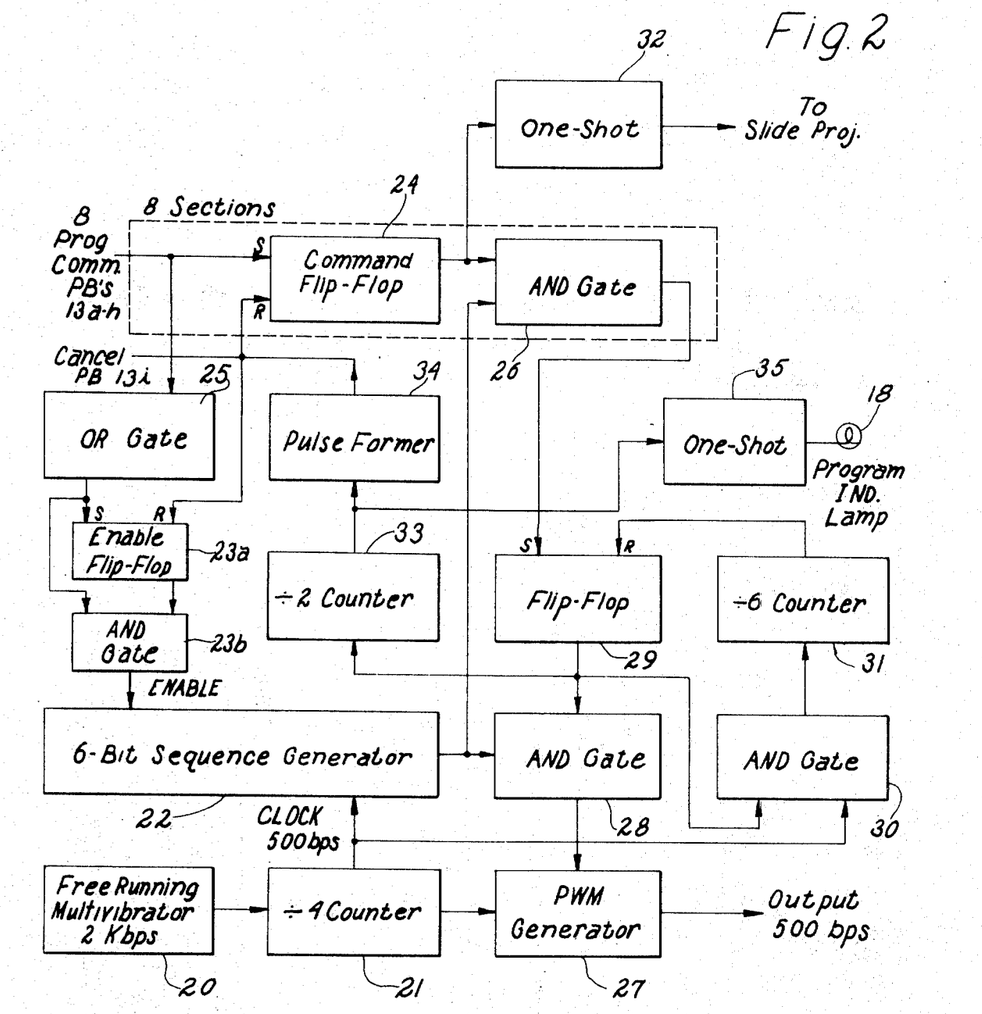
FIG. 2 is a detailed block diagram of the control track signal generator illustrated in FIG. 1.

Referring now to FIG. 2 there is shown a detailed block diagram of the control track signal generator 11 illustrated in FIG. 1 which produces the digital control signal in response to each command entered by means of a corersponding program command pushbutton (PROG. COMM. PB) 13a-13h. The output of the control track signal generator (output of PWM generator 27) is the digital control signal in the above-described ⅔ PWM format which is then passed through filter and delay network 12 and thence to the digital record channel of the record/playback head via relay 14.

The control track signal generator 11 comprises the majority of the circuitry in the programming unit 13 and con conveniently be contained on one printed circuit board. The repetition rate of the digital control signal is 500 bits per second (b.p.s.) and is determined by a conventional free-running 2000 b.p.s. multivibrator circuit 20, and a conventional divide-by-four counter circuit 21 connected to the output of the multivibrator for reducing the repetition rate to 500 b.p.s. A conventional six-bit sequence generator 22 is clocked at the 500 b.p.s. rate from the output of the divide-by-four counter 21. Sequence generator 22 may conveniently include three dual flip-flops with all the outputs held in the high state (logic one) at all times except when a command is entered. The command is entered by means of the ENABLE input to sequence generator 22 from the output of a flip-flop circuit 23a. As stated hereinabove, a program command is initiated by pressing one of the command pushbuttons 13a-13h. Each of the eight pushbuttons provides an input to the SET(S) input of a corresponding command flip-flop 24 (i.e. there are eight flip-flops 24 in the eight sections indicated by dashed outline) which are normally in the reset state. Pressing one of the command pushbuttons 13a-13h causes the associated flip-flop 24 to have its SET input switched to ground potential whereby the output of the flip-flop is set to the high state. The pushbutton input from each of the eight pushbuttons is also supplied to one OR gate 25 such that when any one of the pushbuttons in depressed, the output of gate 25 is switched to the low state. The output of OR gate 25 is connected to the SET input of the enable flip-flop 23a. Thus, with any one of the command pushbuttons 13a-13h depressed, the output of OR gate 25 goes low and sets the enable flip-flop 23a to cause its output to go high. The ouput of enable flip-flop 23a is one input to AND gate 23b. The second input to gate 23b is from the output of OR gate 25. In this way, the ENABLE output of AND gate 23b is prohibited from going high until the COMMAND pushbutton is released. The output of AND gate 23b causes the sequence generator 22 to produce a six-bit sequence output, the sequence beginning in state 111111 and proceeding through a sequence which provides all 63 possible states excluding the all-zero state (000000). The appropriate point in the sequence corresponding to the particular one of the pushbuttons 13a-13h which has been depressed, is determined by the eight AND gates 26 having inputs connected from the outputs of command flip-flops 24 and sequence generator 22. The outputs of the eight AND gates 26 are connected together, the common connection is connected to the SET input of a flip-flop 29, and the output thereof connected to an input of AND gate 28. AND gate 28 has its second input connected to the output of the 6-bit sequence generator 22, and thus, the desired digital word code corresponding to the particular depressed command pushbutton is obtained by gating the output of the sequence generator 22 through AND gate 28 at the appropriate point in the sequence at which the desired word code appears. This allows the output from the sequence generator 22 to pass through to the pulse-width-modulation (PWM) generator 27 via AND gate 28 for six clock pulses only. The ouput from flip-flop 29 also is connected to AND gate 30 which has its second input supplied with the 500 b.p.s. CLOCK pulses developed at the output of divide-by-four counter 21. The output of gate 30 is thus a gated CLOCK signal which is supplied to a divide-by-six counter 31. After six clock pulses have occurred, counter 31 produces an output which resets flip-flop 29 (the output of counter 31 is connected to the RESET(R) input of flip-flop 29) and thereby closes gate 28. This sequence of events permits only six output PWM pulses to appear at the output of PWM generator 27 and then returns the output of PWM generator 27 to a sequence of all zeroes.

The output of the particular flip-flop 24 associated with the SLIDE advance command pushbutton 13a is also connected to the input of a one-shot (multivibrator) 32 which produces a pulse signal initiating operation of the slide projector or other visual display device, and in the case of the slide projector, the signal causes the slide projector to advance one slide.

The CANCEL pushbutton 13i is connected to the common RESET line for the eight flip-flops 24 and thus is a normally open contact which, when closed upon depression of the CANCEL pushbutton, causes the RESET line to be at ground potential thereby resetting any command flip-flops 24 which had been set, and also resetting the enable flip-flop 23a. The CANCEL pushbutton 13i is only effective if it is pressed down while a command pushbutton 13a-13h is being held down since once the command pushbutton is released, the digital word code generation begins (i.e., the digital word code is not generated until the command pushbutton is released).

The purpose of the serially connected divide-by-two counter 33 (connected to the output of flip-flop 29) and pulse circuit 34 are to record each digital command word twice as mentioned hereinabove. The command flip-flops 24 and enable flip-flop 23a are reset after the command has been twice recorded, in response to a pulse produced in circuit 34. One-shot 35 connected to the output of counter 33 lights PROGRAM lamp 18 to verify that the command word has been entered (recorded).

Figure 3A:
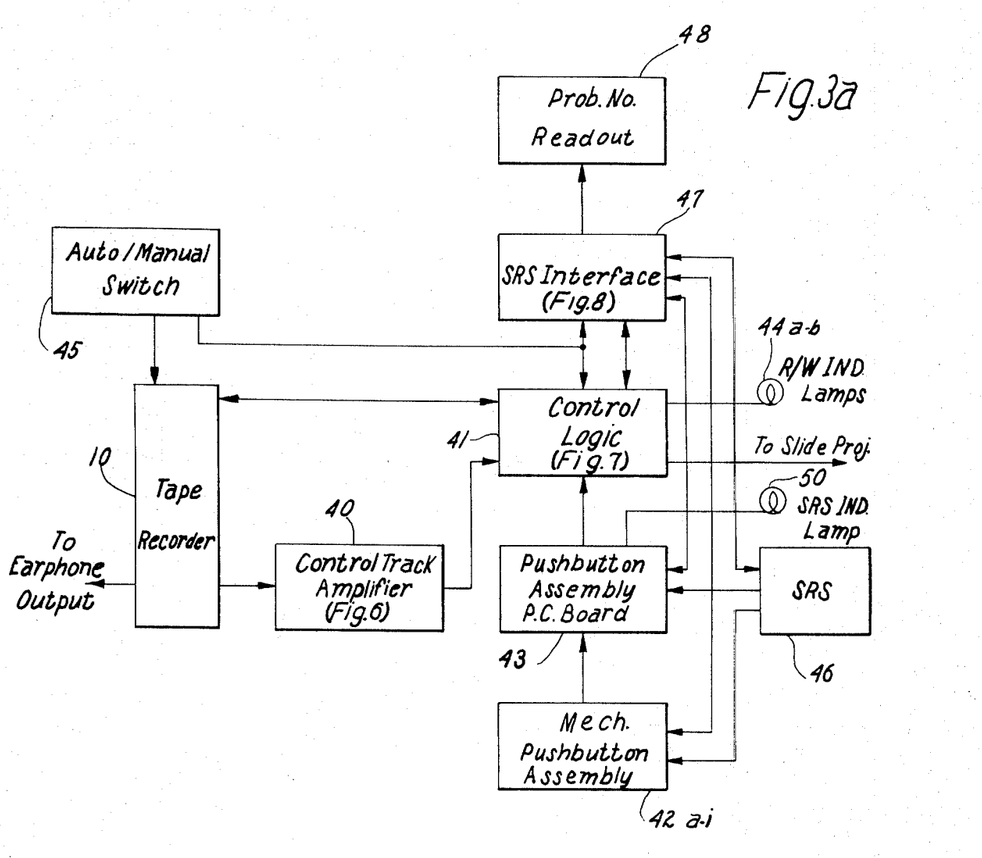
FIG. 3a is a general block diagram of the response component interconnected with a data collection and analysis component (SRS) of my teaching system.
Figure 3B:
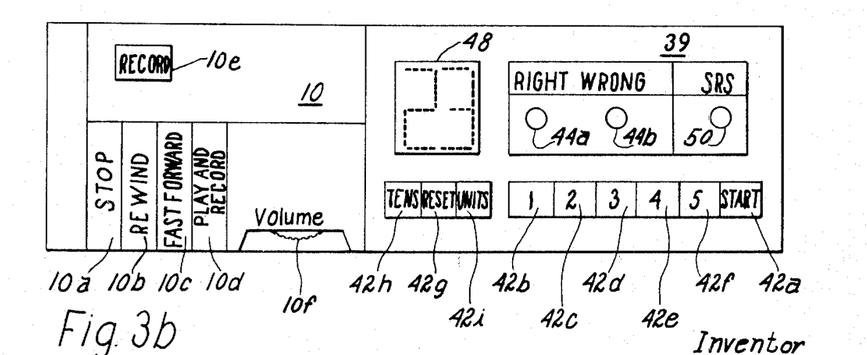
FIG. 3b illustrates the control panel of the response component.

Referring now to FIG. 3a, there is shown a block diagram of the response and data collection and analysis components, and FIG. 3b illustrates a typical control panel provided on the response component. The response component includes a cassette tape recorder 10 and a response unit 39. The tape recorder 10 is similar to the tape recorder employed in the programming component with the exception that no microphone input is required. An earphone output is utilized by the student for listening to the audio information recorded on the first track of the magnetic tape as prepared by the instructor.

A ten pushbutton assembly is used by the student for operation of the response component. The ten pushbuttons are more clearly seen on the control panel view of FIG. 3b and include START button 42a, five MULTIPLE CHOICE (MC) buttons 42b-42f, a RESET button 42g and a pair of problem number buttons 42h and 42i. The tenth pushbutton is the PLAY AND RECORD pushbutton 10d on the tape recorder 10 of the response component.

The student starts the program by pressing the PLAY AND RECORD button 10d on the tape recorder 10 to thereby place the response component in a standby mode with the tape drive off. The lesson in the program is activated by pressing the START button 42a on the response unit, thereby initiating the audio portion of the program as well as the digital portion. The contacts of the START and MC pushbuttons, 42a–43f, respectively, are connected directly to the pushbutton assembly printed circuit board (PB assembly PC board) 43, these pushbutton elements being illustrated in greater detail in FIG. 5. Circuitry on the PB assembly PC board 43 is connected to control logic circuitry 41 which detects and decodes the digital signals for performing the operations dictated by such digital signals. The digital control signal is transmitted from the tape recorder 10 to control logic circuitry 41 by way of a control track amplifier 40. Thus, upon activation of the START button 42a, the lesson begins, and as one example, the lesson may include a presentation of a first slide, followed by a second slide containing a question having one of five multiple-choice answers. The first and second slides are successively presented on a screen automatically in response to first and second SLIDE advance command digital control signals programmed on the tape. The audio which accompanies the slides may instruct the student to answer the question by pressing one of the five MC buttons 42b–42f. A programmed STOP digital command signal at the end of this audio message automatically stops the tape with the second (question) slide presented on the screen. The student now presses one of the five MC buttons, and if his answer is correct, the control logic 41 causes a RIGHT indicator lamp 44a to light. If his answer is wrong, a WRONG lamp 44b lights. In the more general program, the student must continue pressing additional MC buttons if his first selection was wrong, until he obtains the correct answer, and only after the correct answer will he be allowed to continue the lesson. In a more specific program, the instructor may program a NO-CONFIRMATION signal which only requires that the student make one choice before the lesson is allowed to continue, this latter program omitting the confirmation of correctness of his answer in that the RIGHT/WRONG lamps do not light. An AUTOMATIC/MANUAL switch 45 determines whether the operation of the response component is automatically controlled by the digital control signal and internal logic. In the AUTOMATIC position of switch 45, a two digit readout 48, which indicates the problem number, is automatically advanced each time a question or problem is presented. Switch 45 is preferably located on a rear panel of the response unit. The data collection and analysis component 46, herein designated SRS (for student response system), and the problem number readout 48 are connected to the control logic 41 through an SRS interface circuit 47. The SRS component may be of the type illustrated in U.S. Pat. No. 3,500,599 to L. J. Jones et al. and assigned to the assignee of the present invention. The problem number and the student's choice are automatically read into the SRS component 46, and an SRS indicator lamp 50 remains lit during this operation with switch 45 in the AUTOMATIC position. However, with switch 45 in the MANUAL position, the student manually advances the problem number and enters it into the SRS component by pressing the problem number TENS digit and UNITS digit buttons 42h and 42i, respectively. The problem number may be reset to zero by pressing RESET button 42g. In the MANUAL position of switch 45, the response component operation is not automatically controlled and the response unit may be used with no taped program for interaction with the SRS component in a conventional manner as described in U.S. Pat. 3,500,599.

Figure 4:
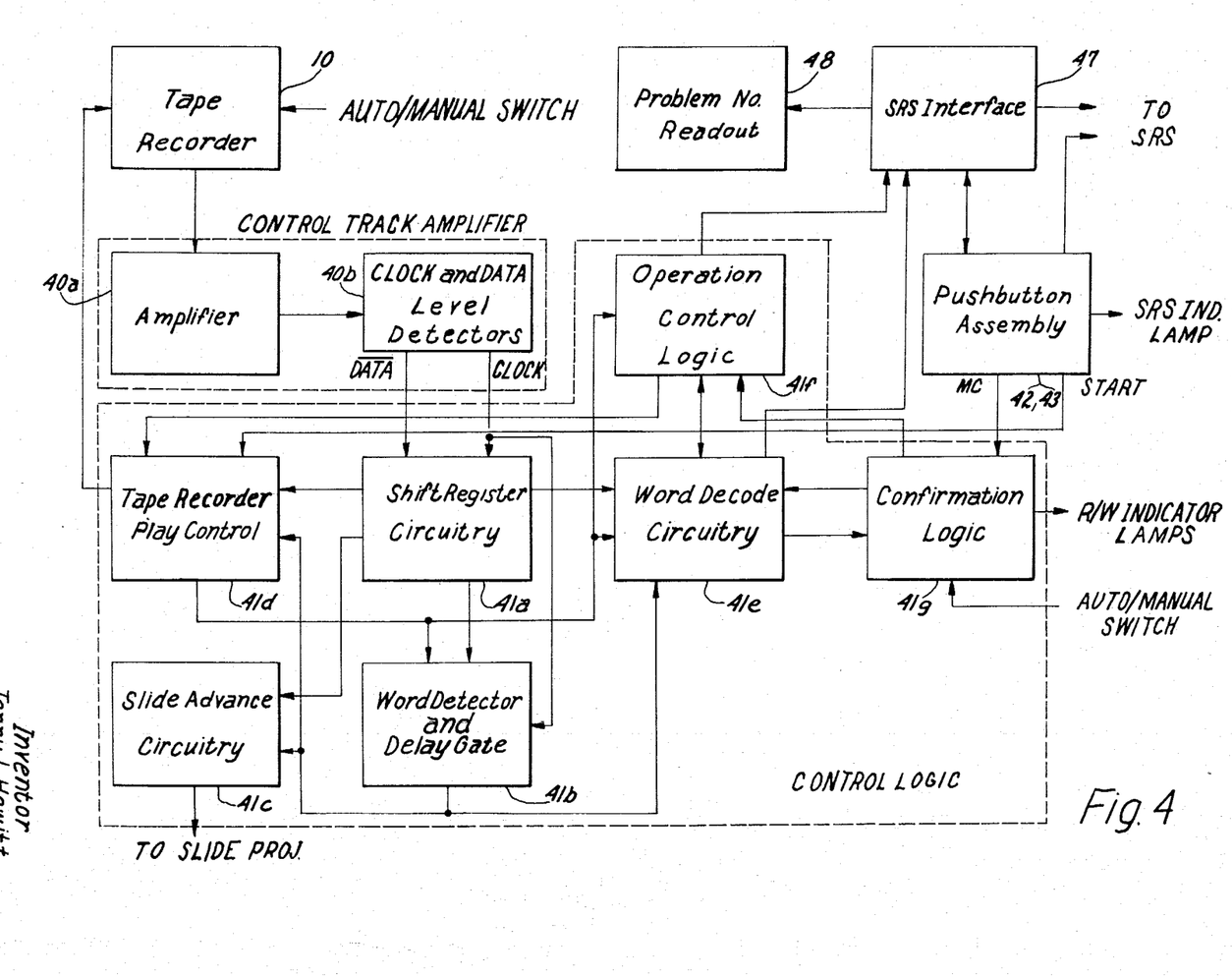
FIG. 4 is a detailed block diagram of the response component.
Figure 6:
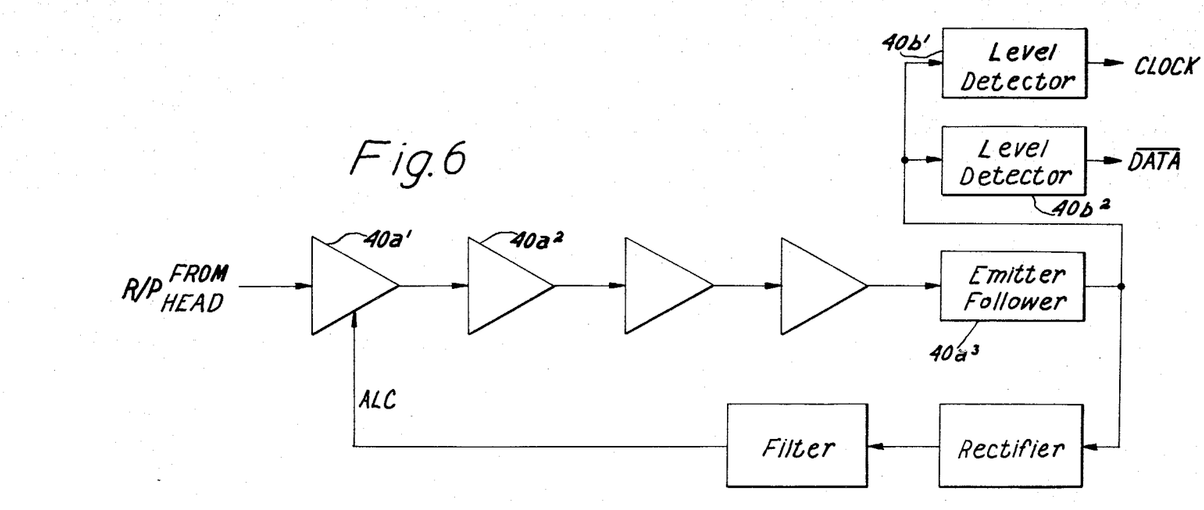
FIG. 6 is a detailed block diagram of the control track amplifier illustrated in FIG. 4.

Referring now to FIG. 4, there is shown a detailed block diagram of the response component. The digital control signal recorded on the second track of the magnetic tape is read off by the playback head of tape recorder 10 and is supplied to the input of control track amplifier 40 which includes an amplifier section 40a and level detector section 40b. The details of the control track amplifier 40 are illustrated in FIG. 6. The amplifier portion 40a includes an automatic level control circuit to maintain the amplifier output at a reasonably constant level. The level detectors 40b detect the positive and negative portions of the amplifier 40a output signal and thereby reconstruct the CLOCK and $\overline{DATA}$ (PWM generator 27 output) components which form the original PWN signal. The CLOCK and $\overline{DATA}$ signals at the output of level detectors 40b are supplied to 6-bit shift register circuitry 41a in the control logic 41 portion of the response unit. Outputs from the first and sixth stages of the shift register are supplied to a word detector and delay gate circuit 41b as the first step in extracting the eight command word codes from the digital control signals. A high state output from circuit 41b is produced only when the first and sixth bits are simultaneously high which is a characteristic of the code format described hereinabove and is the first criterion for detection of a valid word. The word detector circuit 41b output and the outputs from the other four stages of the shift register 41a, bits two through five, are the inputs to three logic circuits 41c, 41d and 41e. The SLIDE word is decoded in the slide advance circuit 41c and results in an output pulse which turns on a silicon controlled rectifier that supplies power to the slide projector to cause it to advance one frame. The STOP word is decoded in the tape recorder play control circuit 41d and results in turning off the tape recorder 10 motor. The binary words for the five MULTIPLE CHOICE answers and the NO CONFIRMATION function are decoded in the word decode circuit 41e.

The delay gate portion of circuit 41b prevents the detection of an erroneous command during periods in which the digital signal is not in a steady-state condition. These periods are usually marked by a transient, noisy signal which occurs whenever the tape recorder starts or stops, and also at the start of the recorded digital signal on the digital track due to the start-up of the tape recorder in the programming unit. The delay gate responds to the CLOCK pulses from the clock level detector 40b, and if no CLOCK pulses are being received, the delay gate holds the output of the word detector 41b both when the tape recorder is stopped and when the tape is moving but there is no recorded signal on the digital track. Upon the arrival of a CLOCK signal, the delay gate causes a delay of several seconds before the hold is removed from the word detector output in circuit 41b.

The prevention of detection of an erroneous command during the slow down condition of the tape recorder when it is being stopped is accomplished by means of an input to the delay gate from the tape recorder play control circuit 41d. Thus, when tape recorder play control circuit 41d receives a STOP command, delay gate 41d produces an immediate hold on the word detector 41d output.

The CLOCK pulse is also used for inhibiting the gating action of logic gates in the word detector circuit 41b in the case wherein such gates should produce false outputs if sampled at the time the shift register is being clocked. This false operation is due to the normal time delays in the logic circuitry, and inhibiting these gates from responding at the time of the shift register transitions remedies this false operation.

As the digital control signal is propagated through the shift register 41a, a series of gates in the word decode circuit 41e receive their inputs from the outputs of the second through fifth stages of the shift register and respond to the codes which correspond to the MULTIPLE CHOICE answers and the NO CONFIRMATION function. When any one of these six possible codes is detected, a flip-flop in the operation logic circuit 41f is set and causes a quad latch to hold the information contained in the bits two through five at that time, this information being held until reset by signals developed in a confirmation logic circuit 41g connected to the output of the word decode circuit 41e. The resetting by the confirmation logic occurs after a correct answer to a MC question is submitted by the student or the student makes at least one response to an NC question. Thus, once a MULTIPLE CHOICE or NO CONFIRMATION signal is detected, the word decode circuit 41e holds the associated information until the tape recorder has stopped and the student has made the necessary response called for by the program.

The output from word decode circuit 41e to the confirmation logic circuit 41g consists of one line for each of the five possible MULTIPLE CHOICE answers. The student's choice is made through the pushbutton assembly 42, 43 and is compared with the correct answer in the confirmation logic 41g. The RIGHT and WRONG indicator lamps 44a and 44b, respectively, are operated by the output of confirmation logic circuit 41g, and are lit in accordance with the correctness of the student's choice. The RIGHT/WRONG indicator lamps provide a visual indication to the student of the correctness of his answer. An input from the AUTO/MANUAL switch 45 disables the confirmation logic when the switch is in the MANUAL position thereby prohibiting operation of the RIGHT/WRONG indicator lamps.

The operation control logic developed in circuit 41f provides constraints on operation of the teaching system to assure proper operation thereof by the student. Two fundamental operations which are controlled by circuit 41f are those associated with the START pushbutton 42a and the five MULTIPLE CHOICE (MC) pushbuttons 42b through 42f. In each case, the operation control logic circuitry maintains (holds) the state in which the response unit is to operate as determined by the interaction between the student, the teaching system and the taped program.

Each time the START pushbuttons 42a is depressed, the START output from the pushbutton assembly 42, 43 is supplied to the tape recorder play control circuit 41d. However, the output from the operation control logic 41f determines whether the START signal will be able to start the tape recorder.

A first hold condition requires the detection of either a MULTIPLE CHOICE (MC) or NO CONFIRMATION (NC) word code in the word decode circuit 41e. An output from the word decode circuit to the operation control logic 41f prevents restart of the tape recorder 10 until the student makes the first correct response to a multiple choice question, or after he has made one choice in the case of a no confirmation question. After the student has made the correct response to a multiple choice (MC) question, the MC pushbuttons 42b through 42f are disabled whereby the only option left to the student is to restart the tape recorder and continue the program.

A second hold condition is the operation of either of the RIGHT/WRONG indicator lamps 44a, b. Thus, after the student makes a choice, if a RIGHT or WRONG indicator light comes on, he cannot restart the tape recorder or make another choice until the light has gone off.

A second operation controlled by the operation control logic 41f is the enabling of the five MC pushbuttons 42b through 42f which is accomplished by an output of the operation control logic 41f transmitted to the pushbutton assembly 42, 43 by way of SRS interface circuit 47. The five MC pushbuttons are enabled only when an output (CHOICE ENABLE, in FIG. 7) of operation control logic 41f is high and when a proper enabling signal (PB COMMON, in FIG. 8) is received from a scanner circuit in the SRS 46. When the AUTO/MANUAL switch 45 is in the MANUAL position, the enabling of the MC pushbuttons depends only on the signal from the SRS scanner.

There are three conditions which determine when the MC pushbuttons are enabled:

(1) the tape recorder is stopped,
(2) an MC or NC signal has been detected, and
(3) neither of the RIGHT or WRONG indicator lamps is on.

As a result of these three conditions, pressing any of the MC pushbuttons has no effect when the tape recorder is playing, and also after the recorder is stopped if no MC or NC signal has been detected since the last time the recorder had been started. Also, after a RIGHT or WRONG indicator lamp comes on, pressing another MC pushbutton has no effect until the light goes out again.

The operation of the mechanical pushbutton assembly 42 consisting of the nine pushbuttons 42a through 42i, and the attached pushbutton assembly printed circuit board 43 has been described hereinabove except for the manner in which these elements are interfaced with the SRS component and the manner in which they operate if more than one MC pushbutton is pressed. Upon an MC pushbutton being pressed, its output first goes to the SRS interface circuit 47 where it is converted from a one-of-five (i.e. five MC pushbuttons) condition to a three bit (bcd-binary coded decimal) code for transmission to the SRS scanner. The scanner (described in the above-referenced U.S. Pat. No. 3,500,559) upon receiving this information recognizes the particular pushbutton pressed by the student and, in response, activates a line that returns to the pushbutton assembly from where it is directed to the confirmation logic 41g as the MC input. Thus, when one of the MC pushbuttons 42b through 42f is depressed in response to a multiple choice question, either the RIGHT or WRONG indicator lamp 44a or 44b becomes illuminated, assuming the program does not call for the NO CONFIRMATION condition.

The five MC pushbuttons 42b through 42f are electrically interlocked on the pushbutton assembly printed circuit board 43 in a manner such that if more than one pushbutton is pressed at a time, the lower numbered pushbutton takes priority and the system responds as if only one pushbutton was depressed.

The same signal which is used to latch (hold) the decoded information whenever an MC or NC word is detected also provides the problem number count and this problem number information is multiplexed with the pushbutton information in the SRS interface circuit 47 and then transmitted to the SRS scanner. The problem number information is also supplied from the SRS interface circuit to the problem number readout 48 which is a two digit number display on the control panel of the response unit. The problem number readout 48 includes circuitry for converging from the four bit (bcd) code to a seven segment format.

Figure 5:
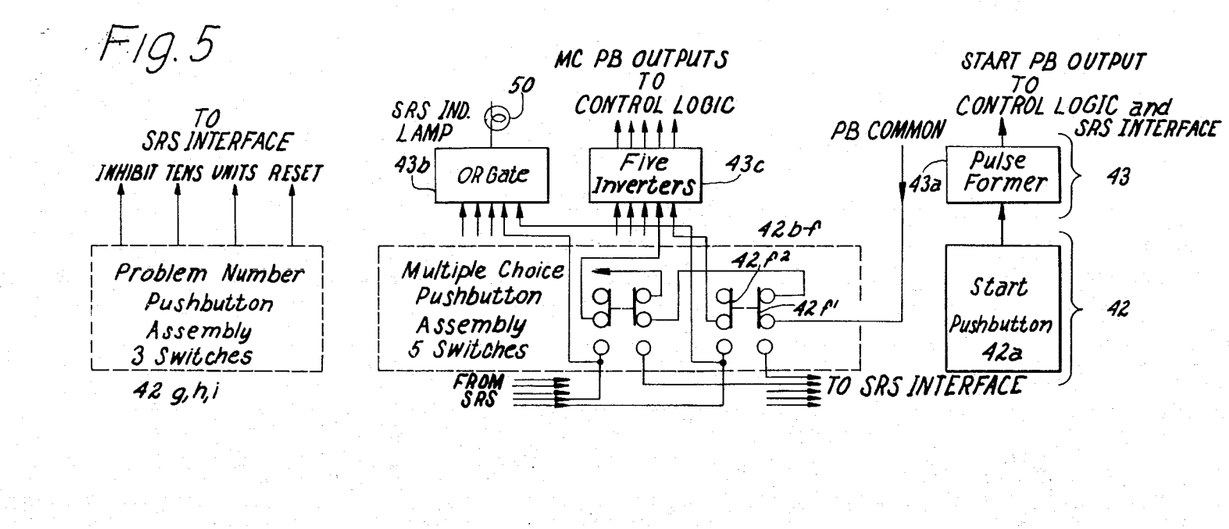
FIG. 5 is a block diagram of the pushbutton assembly illustrated in FIGS. 3a and 4.

A detailed block diagram of the mechanical pushbutton assembly 42 and the pushbutton assembly printed circuit board 43 is illustrated in FIG. 5. The TENS, UNITS and RESET pushbuttons, 42h, 42i and 42g, respectively, are wired directly from the switches to the SRS interface 47. The remaining six pushbuttons, START 42a and the five MC 42b through 42f, are attached to the printed circuit board 43 and the various operations performed by the circuitry on this board are indicated in FIG. 5 at the outputs of the particular elements on the board. Thus, the START pushbutton 42a is connected to a pulse forming circuit 43a such that the START signal is transmitted to the control logic 41 as a short pulse occurring at the time the pushbutton is depressed.

The five MC pushbutton switches 42b through 42f are operative (enabled) only when the pushbutton common (PB COMMON) signal is received from the SRS interface logic. This PB COMMON signal is passed through one normally closed contact 42f¹ such that if more than one pushbutton is pressed at a time, only that pushbutton that occurs first in the sequence will produce an output. When the pushbutton is pressed (the contact moving downward as illustrated in FIG. 5), the PB COMMON signal is switched to the SRS interface logic where it is coded and transmitted to the SRS scanner. The SRS scanner determines that the choice has been made and responds by sending a return signal to the response unit by means of the second set of contacts $42f^2$. This returned signal goes directly to an OR gate $43b$ which activates the SRS indicator lamp 50 on the response unit control panel, this lamp staying lit as long as the signal is being sent from the SRS scanner. The return signal from the SRS also goes through contacts $42f^2$ to the control logic 41 by way of an inverter $43c$.

Referring now to FIG. 6, there is shown a detailed block diagram of the control track amplifier 40 indicated more generally in FIGS. 3a and 4. The amplifier portion $40a$ of control amplifier circuit 40 includes four stages of amplification with the first stage $40a^1$ having a first input supplied from the record/playback (R/P) head of the tape recorder. An automatic level control (ALC) is provided by an attenuator between the first $40a^1$ and second stage amplifiers $40a^2$ by means of a feedback loop from the output of an emitter follower $40a^3$ connected to the output of the fourth stage amplifier. The emitter follower functions as an output driver and its output signal is also supplied to the CLOCK and $\overline{\text{DATA}}$ level detectors $40b^1$ and $40b^2$. The ALC feedback loop includes a rectifier and filter to provide a DC voltage to the attenuator. The positive pulses of the output signal of emitter follower $40a^3$ contain the CLOCK information, and the negative pulses contain the $\overline{\text{DATA}}$ information.

Figure 7:
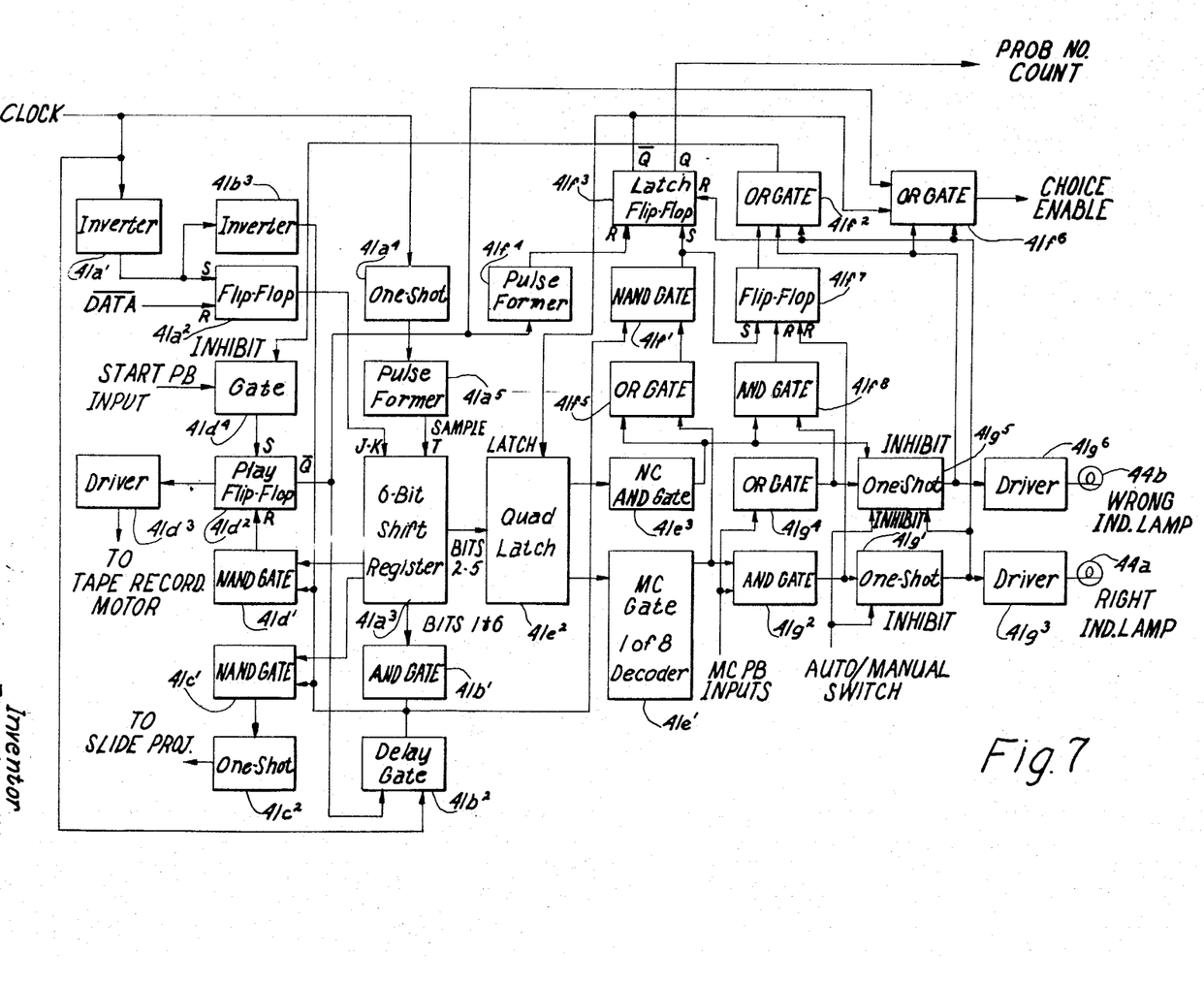
FIG. 7 is a detailed block diagram of the control logic illustrated in FIG. 4.

Referring now to FIG. 7, there is shown a detailed block diagram of the control logic circuit 41 shown generally in FIG. 3a and with some detail in FIG. 4. The CLOCK signal from the output of clock level detector $40b^1$ in the control track amplifier circuit is supplied to inverter $41a^1$ which comprises a transistor. The output of inverter $41a^1$ provides the SET(S) input to a flip-flop $41a^2$, and the $\overline{\text{DATA}}$ signal from the output of the data level detector $40b^2$ provides the RESET(R) input thereto. The output of flip-flop $41a^2$ is the PWM format signal converted into a return-to-zero digital signal and both polarities thereof are supplied to the J–K inputs of six bit shift register $41a^3$. Shift register $41a^3$ is composed of three dual flip-flops. The CLOCK signal from the output of clock level detector $40b^1$ is also supplied to one-shot $41a^4$, and upon triggering thereof, produces a symmetrical square wave at the output thereof. The negative-going transition of this square wave produces an output pulse of about 29 microseconds duration upon passage through pulse forming circuit $41a^5$. This short pulse at the output of circuit $41a^5$ is herein designated as the SAMPLE pulse, and it is supplied to the T input of shift register $41a^3$ for clocking the digital data signal therethrough and thereby converting the return-to-zero output of flip-flop $41a^2$ to a nonreturn-to-zero binary signal propagating through the shift register.

The word detector circuit portion of circuit $41b$ comprises AND gate $41b^1$ having two inputs supplied from the BITS 1 and 6 outputs of shift register $41a$. When the two inputs are both high, the output of gate $41b^1$ is high when permitted by the delay gate portion $41b^2$ of the word detector and delay circuit $41b$ and by inverter $41b^3$ connected to the output of inverter $41a^1$.

The word detector output from AND gate $41b^1$ is supplied to command detection NAND gates $41c^1$, $41d^1$ and $41f^1$. Second inputs to NAND gates $41c^1$, $41d^1$ and $41f^1$ are supplied from the BITS 2–5 outputs of shift register $41a^3$. Thus, when the SLIDE advance code word is detected, the gate $41c^1$ output goes low causing a transistor in one-shot $41c^2$ to conduct thereby turning on the silicon controlled rectifier (SCR) which operates the slide projector to cause a single slide advance.

The tape recorder play control circuit $41d$ is basically a play flip-flop $41d^2$ which is turned on and off to drive a transistor $41d^3$ that switches the tape recorder motor on and off. Play flip-flop $41d^2$ is set by depressing the START pushbutton (PB), whose signal passes through the pulse forming circuit $43a$ (in FIG. 5) and gate $41d^4$. This setting may be inhibited by an INHIBIT input to gate $41d^4$ from an OR gate $41f^2$ in the operation control logic circuit $41f$ to be described hereinafter. Thus, when the START input goes high, play flip-flop $41d^2$ sets and turns on driver transistor $41d^3$ whereby the tape recorder motor is caused to operate. Play flip-flop $41d^2$ is reset by detection of a STOP word in NAND gate $41d^1$. In the case of the AUTO/MANNUAL switch 45 being in the MANUAL position, the motor control transistor $41d^3$ is bypassed and all tape recorder operations are controlled directly by the tape recorder pushbuttons $10a$–$e$.

As stated hereinabove, the delay gate in circuit $41b$ illustrated in FIG. 4 prevents the detection of an erroneous command during periods in which the digital signal is not in a steady-state condition. The delay gate $41b^2$ includes transistor circuitry wherein the collector of one of the transistors is connected to the common line output of AND gate $41b^1$ such that whenever this transistor is switched on, the output of AND gate $41b^1$ is held low and none of the command detection gates $41c^1$, $41d^1$ and $41f^1$ are allowed to operate.

A first holding action on the common line output of word detector AND gate $41b^1$ occurs whenever the tape recorder starts or stops, and also at the start of the recorded digital signal on the digital track due to the start-up of the tape recorder in the programming unit, as mentioned hereinabove. The tape recorder start-up is controlled by delay gate $41b^2$ and is responsive to the CLOCK signal from the output of the clock level detector $40b^1$. When no CLOCK pulses are received, the transistor in the delay gate circuit $41b^2$ is turned on and the common line output from AND gate $41b^1$ is held low. The delay gate circuit $41b^2$ provides a slow-on, fast-off action such that cessation of the CLOCK pulses produces the holding action much quicker than the release of the holding action due to the arrival of a CLOCK pulse, thereby minimizing possible errors due to any gaps in the digital control signals which may have been accidently or purposely placed in the taped program.

A second input to the transistor in the delay gate $41b^2$ is provided from the $\overline{Q}$ output of play flip-flop $41d^2$ to turn on such transistor and thereby produce an immediate hold on the common line output of AND gate $41b^1$ when NAND gate $41d^1$ detects a STOP command and is reset. This action prevents the control logic from responding to any erroneous signals produced as the tape recorder is slowing down to a stop.

A second holding action on the common line output of word detector AND gate $41b^1$ comes from inverter $41b^3$ which has a CLOCK signal input. Since the SAMPLE pulse which triggers (clocks) shift register $41a^3$ occurs at a fixed time after the CLOCK pulse, the CLOCK pulse never goes high just at the time the shift register is clocked. Therefore, the CLOCK pulse is used by inverter $41b^3$ as a further hold on the common line output of gate $41b^3$ to assure that it cannot go high unless the CLOCK pulse is also high. This gating action prevents any possible false operation due to normal time delays in the logic circuitry during shift register transitions.

As the control signal is propagated through shift register $41a^3$, the BITS 2 through 5 outputs thereof are passed through a quad latch $41e^2$ to the NO CONFIRMATION (NC) and MULTIPLE CHOICE (MC) word decode gates $41e^3$ and $41e^1$. Quad latch $41e^2$ comprises four flip-flops, and when unlatched, passes BITS 2–5 directly through. When latched, quad latch $41e^2$ holds these bits until reset. Gate $41e^3$ is an AND gate which responds to the NC word code and gate $41e^1$ responds to the five MC word codes. As long as a latch signal at the $\overline{Q}$ output of latch flip-flop $41f^3$ in the operation logic circuit is high, the BIT 2–5 outputs of shift register $41a^3$ pass directly through quad latch $41e^2$.

Following an NC question, latch flip-flop $41f^3$ is reset by a pulse from pulse forming circuit $41f^4$, the input to circuit $41f^4$ being produced as play flip-flop $41d^2$ turns on. Thus, whenever play flip-flop $41d^2$ is set, by the student pressing the START pushbutton to restart the tape recorder, the $\overline{Q}$ output of the play flip-flop is transmitted to a first RESET input of latch flip-flop $41f^3$ to reset it. Following an MC question, latch flip-flop $41f^3$ is reset by a second RESET input being triggered from the output of the RIGHT one-shot $41g^1$ in the RIGHT indicator lamp circuit of confirmation logic $41g$ thereby assuring that the MC pushbuttons $42b$–$f$ are disabled after a correct answer choice has been made. When latch flip-flop $41f^3$ is in the reset condition, the latch output is high.

When any of the six word codes (the NC and the five MC words) is detected, an output from the appropriate gate ($41e^3$ or $41e^1$) is supplied to OR gate $41f^5$ to thereby produce an output which is supplied to command detection NAND gate $41f^1$. The outputs of the NC and MC gates $41e^3$ and $41e^1$ are normally low and go high when an NC or MC word code is detected. If the output from the word detector AND gate $41b^1$ is also high, and all the other holds are removed, both inputs to NAND gate $41f^1$ are high and the output goes low to thereby produce an output to the SET input of latch flip-flop $41f^3$ and cause the $\overline{Q}$ latch output thereof to go low. When the $\overline{Q}$ latch signal is low, the quad latch $41e^2$ is latched and the states of shift register BIT 2–5 outputs (i.e., the NC or MC word codes) are held (stored) in the quad latch.

The five MC word codes are detected by gate $41e^1$ which is a conventional one-of-eight binary decoder integrated circuit. Only five outputs of MC gate $41e^1$ (which correspond to the five MC answers) are supplied to AND gate $41g^2$. Five corresponding inputs to gate $41g^2$ are also provided from the five MC pushbuttons $42b$–$42f$ (after passing through inverter $43c$ as shown in FIG. 5). If a correct answer choice is made by the student, the output of AND gate $41g^2$ goes high and triggers the RIGHT one-shot $41g^1$ thereby turning on driver transistor $41g^3$ and causing the RIGHT indicator lamp $44a$ to light for approximately three seconds.

All of the MC pushbutton inputs are also supplied to an OR gate $41g^4$ so that when any of the MC pushbutton inputs is received, this OR gate output goes high. The output of OR gate $41g^4$ triggers WRONG one-shot $41g^5$ if an INHIBIT signal from the RIGHT one-shot $41g^1$ is not present. The output of one-shot $41g^5$ turns on driver transistor $41g^6$ to cause the WRONG indicator lamp $44b$ to light for approximately five seconds. OR gate $41g^4$ responds each time an MC pushbutton input is received, but WRONG one-shot $41g^5$ operates only when the wrong answer choice has been made. Therefore, if the confirmation logic has determined that the student's answer choice is correct, the RIGHT one-shot $41g^1$ output will be high and provides an INHIBIT input to WRONG one-shot $41g^5$ to prevent the latter one-shot from being triggered.

When AUTO/MANUAL switch 45 is in the MANUAL position, the RIGHT and WRONG one-shots $41g^1$ and $41g^5$ are prevented from being triggered by an INHIBIT input and thus neither RIGHT or WRONG indicator lamp is lit.

The operation control logic circuit $41f$ provides the constraints on operation of the teaching system to assure its proper use by the student. Two fundamental operations are controlled, namely, operation of the START pushbutton $42a$ and the five MC pushbuttons $42b$–$f$. Each time the START pushbutton $42a$ is depressed, the START PB output from the pushbutton assembly is supplied to gate $41d^4$. However, an INHIBIT input to gate $41d^4$ from OR gate $41f^2$ determines whether the START signal will set the play flip-flop $41d^2$ and start the tape recorder motor. This inhibiting action is provided by the presence (high state) of any of three inputs to OR gate $41f^2$. The first input to OR gate $41f^2$ is the output of flip-flop $41f^7$ which is set by the output of NAND gate $41f^1$ which also sets flip-flop $41f^3$. As discussed hereinabove, gate $41f^1$ provides an output when either an NC or MC word code is detected and flip-flop $41f^7$ therefore remains in the reset condition until an NC or MC word code is detected. When flip-flop $41f^7$ is set, it provides an input to OR gate $41f^2$ which provides the INHIBIT input to gate $41d^4$. Flip-flop $41f^7$ remains set until it is reset by either of two RESET signals, one being the output of AND gate $41g^2$ which goes high when the student makes the correct response to a multiple choice question, and the second RESET possibility being from AND gate $41f^8$. AND gate $41f^8$ has two inputs, one from NC AND gate $41e^3$ and the other from OR gate $41g^4$ and thus provides a RESET pulse for any MC pushbutton entry following the detection of an NC word code. Flip-flop $41f^7$ is therefore set when either an NC or MC word code is detected, and is reset for a correct answer to an MC question or for the first choice in an NC operation. The other two inputs to OR gate $41f^2$ come from the outputs of the RIGHT and WRONG one-shots $41g^1$ and $41g^5$ and thus provide that the tape recorder cannot be restarted until the RIGHT or WRONG indicator lamps have gone off. Since these events provide a hold for the START pushbutton, it follows that the tape recorder cannot be restarted following detection of an MC or NC code until all the inputs to OR gate $41f^2$ are absent (low).

Figure 8:
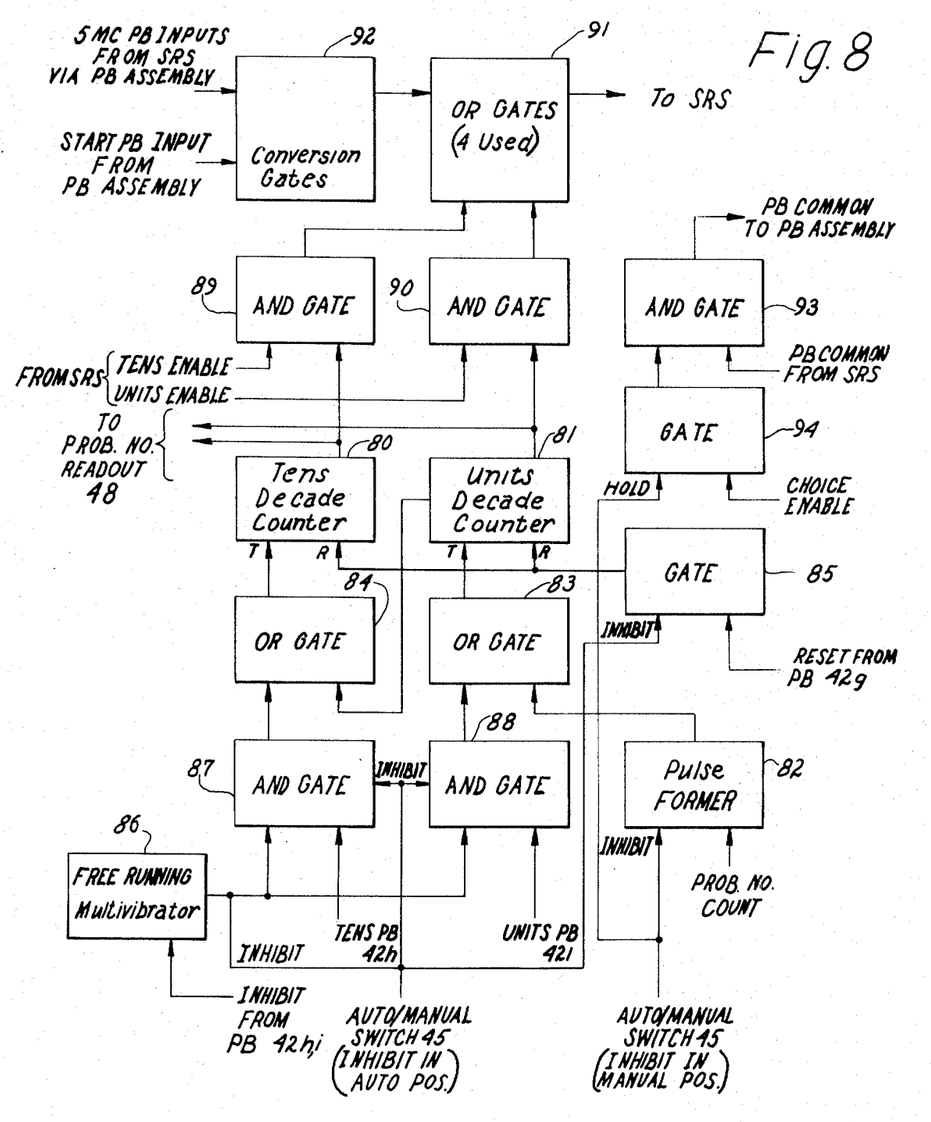
FIG. 8 is a detailed block diagram of the response component SRS interface.

The second operation controlled by the operation control logic $41f$ is the enabling of the five MC pushbuttons. This enabling operation is effected by the CHOICE ENABLE signal developed at the output of OR gate $41f^6$ and supplied to a gate 93 in the SRS interface circuit as seen in FIG. 8, the high state of such signal causing the PB COMMON signal developed in the SRS interface to go high. The PB COMMON signal is supplied to the MC pushbuttons as seen in FIG. 5. The CHOICE ENABLE signal is generated in OR gate $41f^6$ which receives inputs from play flip-flop $41d^2$, latch flip-flop $41f^3$ and the RIGHT and WRONG one-shots $41g^1$ and $41g^5$. Thus, the MC pushbuttons are enabled only when the tape recorder is stopped, an MC or NC command has been detected and neither RIGHT or WRONG indicator lamp is on. The MC pushbuttons are disabled after a correct answer to a question is made, since this causes the latch flip-flop $41f^3$ to reset (from the output of one-shot $41g^1$) thereby removing the CHOICE ENABLE signal (i.e., it goes low) and provides that, after a correct answer choice is made, no more choices may be made for that question. The latch flip-flop also provides the PROBLEM NUMBER COUNT output (the Q output) which goes high each time an MC or NC question is detected. This PROB. NO. COUNT output is transmitted to the problem number readout 48 (by means of the SRS interface circuit) and causes the count to advance each time the latch flip-flop Q output goes high. The problem may be displayed both on the visual material such as the projected slide, and on the student's response unit to assure the student of synchronization between the two devices.

Referring now to FIG. 8, there is illustrated the SRS interface circuitry shown generally in FIG. 3a as element 47 and which is used to accumulate and store the problem number count and to interface the response unit with the SRS scanner. The problem counting is performed by two decade counters 80 and 81. The units counter 81 is driven in either of two ways depending on the state of the AUTO/MANUAL switch 45. With the switch in the AUTO position, the counter 81 counts the PROB. NO. COUNT pulses from the control logic (output of latch flip-flop $41f^3$) which are produced by detection of MC and NC questions as they are presented to the student. With the switch in the MANUAL position, the input pulses to the counters are controlled by the TENS and UNITS pushbuttons, 42h and 42i, respectively, on the control panel.

The PROB. NO. COUNT from the Q output of latch flip-flop 41f³ is first transmitted through a pulse forming network 82 which produces an output pulse each time the input goes high. The output pulse is then transmitted through OR gate 83 to the trigger (T) input of the units counter 81. Each time the units counter reaches a decade, it produces an output which is transmitted through OR gate 84 to the trigger input of tens counter 80. The counters are reset to zero through gate 85 by means of the RESET pushbutton 42g. An INHIBIT input to pulse forming circuit 82 is provided from the AUTO/MANUAL switch to permit the counter to be reset only when the switch is in the MANUAL position. Decade counters 80, 81 may also be triggered by a free running multivibrator 86 which is controlled by the TENS and UNITS pushbuttons 42h and 42i, respectively. When the AUTO/MANUAL switch is in the AUTO position, multivibrator 86 is held off. The multivibrator output is connected to OR gates 84 and 83 by means of AND gates 87 and 88, respectively. Thus, when the AUTO/MANUAL switch is in the AUTO position, it holds off (inhibits) multivibrator 86 and also disables gates 87 and 88 thereby permitting counters 80, 81 to be triggered from the PROB. NO. COUNT input through pulse forming circuit 82 as previously described. When the AUTO/MANUAL switch is in the MANUAL position, the switch inhibit is removed from multivibrator 86 and the multivibrator is then controlled by the TENS and UNITS pushbuttons 42h and 42i, respectively. With neither pushbutton depressed, multivibrator 86 remains off. When either the UNITS or TENS pushbutton is depressed, the inhibit is removed from multivibrator 86 which then begins to operate with positive pulses that are transmitted to the units or tens decade counters as determined by the states of AND gates 87 and 88.

The four-line outputs of counters 80 and 81 are transmitted to the problem number readout 48 on the control panel of the response unit, and also to the input of AND gates 89 and 90, respectively. The AND gates 89 and 90 also respectively receive TENS ENABLE and UNITS ENABLE inputs from the SRS scanner which causes the counter outputs to be scanned out and transmitted to the SRS. When either the TENS ENABLE or UNITS ENABLE inputs to AND gates 89 and 90 go high, the appropriate gate is enabled and passes the state of the counter to four OR gates 91. The four outputs of OR gates 91 provide the inputs to the SRS which transmit the tens and units counts to the SRS as well as the MC pushbutton entries (in bcd code) and the START entry. These entries are made via conversion gates 92 which receive their six inputs from the five MC and START pushbuttons by means of the pushbutton printed circuit board 43 illustrated in FIG. 3a and provide a four-line output to OR gates 91.

The five MC pushbuttons are able to produce outputs only when the PB COMMON output of AND gate 93 in being transmitted. The manner in which this signal is produced depends initially on whether the AUTO/MANUAL switch is in the AUTO or MANUAL position. With the switch in the AUTO position, the HOLD input to gate 94 (common with the INHIBIT input to pulse forming circuit 82) is removed and gate 94 responds to the CHOICE ENABLE input supplied from the control logic circuit OR gate 41f⁶ in FIG. 7. When the CHOICE ENABLE input goes high, the output of gate 94 also goes high and allows gate 93 to respond to the PB COMMON input from the SRS scanner. When this PB COMMON signal is received, AND gate 93 produces its own PB COMMON output which is transmitted to the pushbutton printed circuit board 43 and enables the five MC pushbuttons.

With the AUTO/MANUAL switch in the MANUAL position, the HOLD signal is transmitted to gate 93 and holds the output of the gate high so that the PB COMMON input from the SRS goes directly through gate 93 such that the response component operates directly on the command of the SRS.

From the foregoing, it is readily apparent that the objectives set forth have been met. Thus, my invention provides a teaching system having an audio, visual and student response capability provided by the tape recorder and response unit, and also includes the recording of the student's responses by means of the SRS component. The programming component is relatively simple to operate and therefore does not require extensive programming expertise on the part of the instructor. These advantages are obtained primarily from my novel use of a two track tape recording wherein self-clocking digital control signals are recorded on one track, these self-clocking digital signals in conjunction with the response unit logic commanding various automatic operations such as stopping the program at predetermined points, providing for responses to multiple choice questions either with or without confirmation to the student of the correctness of his answer, and automatically advancing slides in a slide projector interconnected with the response unit. The multiple-choice answers can obviously be less than five in number, if desired. The response component is operated by the student, and the data collection and analysis component (SRS) is adapted for recording the responses from a plurality of response components operated by a corresponding number of students. Although a six-bit word code length has been described herein, other multi-bit word code lengths can be used, the particular bit length being primarily determined by the number of digital commands to be utilized in the program. Also, the bit number lengths of the multi-bit word code and the number of stages of the multi-bit sequence generator 22 in the control track signal generator need not necessarily be identical. It should be obvious that in the case of word code lengths of other than six bits, the shift register 41a³ would have a bit capacity corresponding to the bits in the multi-bit word code, and the latch circuit 41e² would have a capacity of two bits less. It is, therefore to be understood that changes may be made in the particular embodiment as described which are within the full intended scope of the invention as defined by the following claims.

What I claim as new and desire to secure by Letters Patent of the United States is:

1. An audio-visual-response teaching system comprising
   a programming component, a response component, and a data collection and analysis component interconnected with said response component,
   said programming component adapted to be operated by an instructor and comprising a first two-track tape recorder and a programming unit,
   said first two-track tape recorder comprising means for recording analog signals on a first track of a tape in the tape recorder wherein the analog signals represent an audio program to be presented to a student,
   said programming unit comprising,
      a control panel provided with a first plurality of command pushbuttons, and
      means in communication with said first plurality of pushbuttons and said first tape recorder for continuously recording pulse-width-modulated self-clocking digital control signals on a second track of the tape, the digital control signals being of equal duration except at appropriate points in the audio program wherein the digital signals represent commands for automatic operations such as remotely operating a visual display device interconnected with said response component and stopping the tape after a question has been presented to a student and for providing no confirmation to the student of the correctness of the student's answer response and for storing the correct answer of a plurality of answer choices to the question, the instructor programming the digital signals by depressing a selected one of said first plurality of pushbuttons corresponding to the particular command to be recorded on the tape, said response component adapted to be operated by the student and comprising a second two-track tape recorder and a response unit, said second two-track tape recorder comprising means for detecting the analog signals recorded on the first track of the tape whereby the audio program is presented to the student, said response unit comprising
- a control panel provided with a START pushbutton whereby the student controls starting operations of the response component, and a second plurality of MULTIPLE CHOICE answer pushbuttons, the student responding to the questions presented to him by depressing a selected one of said MULTIPLE CHOICE pushbuttons to indicate his choice of an answer thereto,
- means in communication with said second tape recorder for detecting the pulse-width-modulated self-clocking digital control signals continuously recorded on the second track of the tape,
- means in communication with said digital control signal detecting means for decoding the detected digital control signals to thereby decode the correct answer choice to the question and perform any other commands dictated by the decoded digital signals,
- means in communication with said digital signal decoding means and said second plurality of pushbuttons for providing confirmation to the student of the correctness of the student's answer choice, and
- means in communication with said digital signal decoding means and said confirmation means for providing no confirmation to the student of the correctness of his answer choice in response to a NO CONFIRMATION command, and
- an interface circuit for interconnecting said response component with said data collection and analysis component, each student's answer response being transmitted through said interface circuit to said data collection and analysis component for recordation therein.

2. The audio-visual-response teaching system set forth in claim 1 wherein
said means for continuously recording pulse-width-modulated self-clocking digital control signals on the second track of the tape comprises
a control track signal generator in communication with said first plurality of command pushbuttons for generating a particular multi-bit sequence defining a desired digital word code in response to the particular depressed command pushbutton on the program unit control panel, the leading edge of each digital signal pulse being at the system CLOCK repetition rate thereby including the CLOCK component and the pulse width determining the DATA component of the digital signal, and
means in communication with an output of said control track signal generator for transmitting the generated multi-bit sequence digital word code composed of pulse-width-modulated self-clocking digital pulses to a record head in said first tape recorder upon depression of a RECORD pushbutton on the program unit control panel, the RECORD pushbutton in communication with said first tape recorder.

3. The audio-visual-response teaching system set forth in claim 2 wherein said control track signal generator comprises
a free-running multivibrator,
a multi-bit sequence generator clocked by said multivibrator, and
first logic circuit means in communication with said programming unit command pushbuttons and said multi-bit sequence generator for producing a multi-bit sequence output therefrom upon one of said command pushbuttons being depressed and released.

4. The audio-visual-response teaching system set forth in claim 3 wherein said control track signal generator further comprises
a pulse-width generator producing a sequence of all logic ZEROES until interrupted at an appropriate point in the sequence, and
second logic circuit means in communication with said multi-bit sequence generator and said first logic circuit means for gating the output of said multi-bit sequence generator at the appropriate point in the sequence corresponding to the particular command pushbutton operated, the gated output of said multi-bit sequence generator in communication with a first input of said pulse-width generator, output of said free-running multivibrator connected to a second input of said pulse-width generator to provide at the output thereof a multi-bit sequence beginning with the desired multi-bit word code corresponding to the particular command pushbutton operated.

5. The audio-visual-response teaching system set forth in claim 4 wherein said control track signal generator further comprises
third logic circuit means in communication with said free-running multivibrator and said second logic circuit means for closing the gated output of said multi-bit sequence generator after only a particular plurality of pulse-width-modulated pulses appear at the output of said pulse-width generator whereby the output thereof is only a single desired multi-bit sequence word code corresponding to the particular command pushbutton operated, the output of said multi-bit sequence generator held in the logic ONE state at all times except when a command is entered whereby each of the plurality of multi-bit word codes have logic ONES as the first and last bits thereof, the bit number lengths of the multi-bit word code and number of stages of said sequence generator not necessarily being the same.

6. The audio-visual-response teaching system set forth in claim 2 wherein said control track signal generator comprises
a free-running multivibrator,
a six-bit sequence generator clocked by said multivibrator,
a plurality of first flip-flops corresponding to the plurality of commands provided by the digital control signals, SET inputs of said first flip-flops connected to the corresponding first plurality of command pushbuttons on the programming unit control panel,
the plurality of command pushbuttons also connected to an input of an OR gate,
output of said OR gate connected to a SET input of a second flip-flop, output of said second flip-flop connected to a first input of a first AND gate, output of said OR gate also connected to a second input of said first AND gate whereby an output of said first AND gate is ineffective until the particular command pushbutton is released, output of said first AND gate connected to an ENABLE input of said six-bit sequence generator to cause said sequence generator to produce a six-bit sequence output when the command pushbutton is released.

7. The audio-visual-response teaching system set forth in claim 6 wherein said control track signal generator further comprises
a like plurality of second AND gates having first inputs connected to outputs of corresponding said first flip-flops and having second inputs connected to outputs of said six-bit generator,
outputs of said plurality of second AND gates connected to a SET input of a third flip-flop, output of said third flip-flop connected to a first input of a third AND gate,
output of said six-bit sequence generator connected to a second input of said third AND gate whereby a desired digital word code corresponding to the particular depressed command pushbutton is obtained by gating the output of said six-bit sequence generator through said third AND gate at an appropriate point in the sequence at which the desired word code appears,
an output of said third AND gate connected to a first input of a pulse-width generator, said pulse width generator producing a sequence of all logic ZEROES until interrupted at the appropriate point in the sequence, output of said free-running multivibrator connected to a second input of said pulse-width generator to provide at the output thereof the desired six-bit sequence word code in pulse-width-modulated self-clocking digital form.

8. The audio-visual-response teaching system set forth in claim 7 wherein said control track signal generator further comprises
an output of said third flip-flop connected to a first input of a fourth AND gate, output of said free-running multivibrator connected to a second input of said fourth AND gate whereby the output of said fourth AND gate is a gated clock signal,
a divide-by-six counter having an input connected to the output of said fourth AND gate and an output connected to the RESET input of said third flip-flop whereby after six clock pulses, said divide-by-six counter resets said third flip-flop and thereby closes said third AND gate thereby permitting only six pulse-width-modulated pulses to appear at the output of said-width generator,
said digital control signal being of the 2/6 pulse-width-modulated type, output of said six-bit sequence generator held in the logic ONE state at all times except when a command is entered whereby each of the plurality of six-bit word codes have logic ONES as the first and sixth bits thereof.

9. The audio-visual-response teaching system set forth in claim 1 wherein said programming unit control panel command pushbuttons comprise.
a pushbutton providing a command signal for initiating operation of the visual display device,
a STOP pushbutton providing a command signal for stopping the second tape recorder at the appropriate points in the audio program,
a plurality of MULTIPLE CHOICE answer pushbuttons, one of which is selected by the instructor for representing the one correct answer choice of the like plurality of answer choices to the question presented to the student, and
a NO CONFIRMATION pushbutton providing a command signal which provides no confirmation to the student of the correctness of his answer choice.

10. The audio-visual-response system set forth in claim 1 wherein
said means for detecting the analog signals being playback means supplying audio signals to a pair of earphones utilized by the student, and
said data collection and analysis component adapted to be interconnected with a plurality of response components whereby a like plurality of students can each be instructed at his own particular pace.

11. The audio-visual-response teaching system set forth in claim 2 wherein said means for detecting the digital control signals comprising
a control track amplifier having an input connected to the playback head of said second tape recorder, said control track amplifier including a pair of level detectors for detecting positive and negative portions of the digital signal and thereby reconstructing the CLOCK and DATA components of the pulse-width-modulated self-clocking digital control signals at the outputs thereof,
a multi-bit shift register circuit having J–K inputs connected to the DATA output of said control track amplifier and having a trigger input connected to the CLOCK output of said control track amplifier, and
a word detector and delay gate circuit, the word detector thereof having inputs connected to the first and last bit outputs of said shift register, the logic ONE state output of the word detector being produced only when the first and last bits are simultaneously logic ONE to thereby satisfy a criteria for detection of a valid command word code.

12. The audio-visual-response teaching system set forth in claim 11 wherein said means for decoding the detected digital control signals comprises
a slide advance logic circuit,
a tape recorder play control logic circuit, and
a word decode logic circuit,
outputs of the shift register stages intermediate the first and last bits and the output of said word detector connected to inputs of said slide advance, tape recorder play control and word decode logic circuits,
the decoding of a slide advance command word code in said slide advance logic circuit causing the visual display device to operate,
the decoding of a STOP command word code in said tape recorder play control logic circuit causing the tape recorder to turn off, said response unit control panel START pushbutton connected to said tape recorder play control logic circuit for causing the tape recorder to turn on, and
the decoding of a MULTIPLE CHOICE word code in said word decode logic circuit storing therein the correct answer choice to the question presented to the student and the decoding of a NO CONFIRMATION word code in said word decode logic circuit providing no confirmation to the student of the correctness of his answer choice.

13. The audio-visual-response teaching system set forth in claim 12 wherein said word decode logic circuit comprises
a latch circuit having inputs connected to the intermediate bit stages of said shift register,
a multi-input, multi-output gate circuit, the multi-outputs thereof connected to outputs of said latch circuit which provide the plurality of multiple choice answer word code bits, and
an AND gate having inputs connected to outputs of said latch circuit which provide the NO CONFIRMATION word code bits, and
an operation control logic circuit including a latch flip-flop having a SET input in communication with the outputs of the gate circuit in said word decode logic circuit, output of said latch flip-flop connected to a LATCH input of said latch circuit whereby said latch flip-flop becomes set when any of the multiple-choice or NO CONFIRMATION word codes is detected and thereby causing said latch circuit to hold the data contained in the intermediate bits until reset by a signal developed in a confirmation logic circuit.

14. The audio-visual-response teaching system set forth in claim 13 and further comprising
a confirmation logic circuit connected to outputs of said word decode logic circuit and comprising
a plurality of AND gates having first inputs connected to the outputs of said word decode logic circuit multi-input, multi-output gate circuit and second inputs connected to the plurality of MULTIPLE CHOICE pushbuttons on said response unit control panel, the MULTIPLE CHOICE pushbuttons also connected to multiple inputs of an OR gate, outputs of said confirmation logic circuit AND gates and OR gate connected respectively to first inputs of first and second one-shots, outputs of said first and second one-shots in communication with RIGHT and WRONG lamps, output of said first one-shot also connected to a first INHIBIT input of said second one-shot, output of said word decode logic AND gate connected to a second INHIBIT input of said second one-shot, the student's choice of an answer as indicated by the particular depressed MULTIPLE CHOICE pushbutton on said response unit control panel being compared in said AND gates with the correct answer stored in said word decode logic circuit multi-input, multi-output gate, a correct answer response by the student causing an appropriate said confirmation logic circuit AND gate to trigger said first one-shot and light said RIGHT lamp thereby confirming to the student the correctness of his answer choice and, a correct answer response inhibiting said second one-shot to prevent said WRONG lamp from being lit, an incorrect answer response causing said confirmation logic OR gate to trigger said second one-shot to thereby light said WRONG lamp, a NO CONFIRMATION word code also inhibiting said second one-shot.

15. The audio-visual-response teaching system set forth in claim 14 and further comprising an output of said confirmation logic first one-shot connected to a first RESET input of said operation control logic latch flip-flop, a second RESET input of said latch flip-flop in communication with said tape recorder play control logic circuit whereby the data contained in the intermediate bits is held in the latch circuit until the tape recorder has stopped and the student has made the correct answer response to the multiple choice question or has made at least one response to a NO CONFIRMATION question.

16. The audio-visual-response teaching system set forth in claim 12 wherein the delay gate having a first input from the CLOCK output of said control track amplifier, said delay gate responding to the clock pulses and if none are being received, the delay gate holding the output of the word detector both when the tape recorder is stopped and when the tape is moving but there is no recorded signal on the digital track, the arrival of a CLOCK pulse causing said delay gate to produce a delay before the hold is removed from the word detector output to thereby prevent the detection of erroneous commands during periods in which the digital signal is not in a steady state condition.

17. The audio-visual-response teaching system set forth in claim 16 and further comprising a second input to said delay gate from said tape recorder play control logic circuit for prevention of detection of an erroneous command during the slowdown condition of the tape recorder when it is being stopped, the detection of a STOP command in said tape recorder play control logic circuit producing an immediate hold on the output of the word detector.

18. The audio-visual-response teaching system set forth in claim 15 and further comprising said operation control logic circuit having inputs in communication with the output of said delay gate, the output of said word decode logic gate circuit and said confirmation logic circuit, and having an output connected to an INHIBIT input of said tape recorder play control logic circuit to prevent restart of the tape recorder motor upon detection of a MULTIPLE CHOICE word code until the student selects the correct answer response, or upon detection of a NO CONFIRMATION word code to prevent restart of the tape recorder motor until after a first answer choice has been selected by the student.

19. A response component adapted for use in an audio-visual-response teaching system and to be operated by a student and comprising a two-track tape recorder and a response unit, said two-track tape recorder comprising means for detecting analog signals recorded on the first track of the tape whereby an audio program is presented to the student, said response unit comprising a control panel provided with a START pushbutton whereby the student controls starting operations of the response component, and a plurality of MULTIPLE CHOICE answer pushbuttons, the student responding to a question presented to him by depressing a selected one of said MULTIPLE CHOICE pushbuttons to indicate his choice of an answer thereto, means in communication with said tape recorder for detecting pulse-width-modulated self-clocking digital control signals continuously recorded on the second track of the tape wherein the digital control signals are of equal duration except at appropriate points in the audio program and represent particular commands, means in communication with said digital control signal detecting means for decoding the detected digital control signals to thereby decode a correct answer choice to the question and perform any other commands dictated by the decoded digital signals, means in communication with said digital signal decoding means and said plurality of pushbuttons for providing confirmation to the student of the correctness or incorrectness of the student's answer choice, and means in communication with said digital signal decoding means and said confirmation means for providing no confirmation to the student of the correctness of his answer choice in response to a NO CONFIRMATION command digital signal.

References Cited
UNITED STATES PATENTS

| | | | |
|---|---|---|---|
| 3,210,864 | 10/1965 | Tillotson III et al. | 35—9 A |
| 3,509,549 | 4/1970 | Ohta et al. | 340—174.1 H |
| 3,500,559 | 3/1970 | Jones et al. | 35—48 R |

WILLIAM H. GRIEB, Primary Examiner

U.S. Cl. X.R.

340—174.1 G, 174.1 H